United States Patent [19]

Baker et al.

[11] Patent Number: 4,935,906
[45] Date of Patent: Jun. 19, 1990

[54] SCANNING SONAR SYSTEM

[75] Inventors: William Baker; Kevin E. Nortrup, both of Indianapolis; James C. Stevens, Plainfield, all of Ind.

[73] Assignee: Span, Inc., Indianapolis, Ind.

[21] Appl. No.: 141,693

[22] Filed: Jan. 4, 1988

[51] Int. Cl.[5] ............................................ G01S 15/96
[52] U.S. Cl. ..................................... 367/111; 367/104
[58] Field of Search ................. 367/99, 103, 104, 105, 367/111, 113, 107

[56] References Cited

U.S. PATENT DOCUMENTS

| | | | |
|---|---|---|---|
| 3,793,619 | 2/1974 | Regis ................................... | 367/113 |
| 3,868,622 | 2/1975 | Knott ................................... | 367/115 |
| 4,282,590 | 8/1981 | Wingate ............................... | 367/104 |
| 4,300,216 | 11/1981 | Barton, Jr. .......................... | 367/113 |
| 4,815,048 | 3/1989 | Boucher et al. .................... | 367/104 |

OTHER PUBLICATIONS

Model 480 LCD Video–Sonar, 1983, p. 8.
3D–100 Installation and Operation Manual, Dec. 1987.
Ray Jefferson Color Telescan-2000 Instruction Manual, 1987.
Cabela's 1987 Christmas Catalog, Eagle 3D-100 advert, 12-25-1987.
Bass Pro Shops 1988 Catalog, Eagle 3D-100 advertisement, 1-1988, p. 442.

*Primary Examiner*—Thomas H. Tarcza
*Assistant Examiner*—Daniel T. Pihulic

[57] ABSTRACT

Images of underwater features, animate and inanimate, are produced from substantial distances in any direction around a boat, using small and easily mountable sonar devices, including three sonar transducers, two being stationary and the third being directable, the transducers being operable at various ultrasonic frequencies. Under keyboard control and using completely integrated electronic circuitry, images and echo sounding reports are generated on a graphic video display. The images include a sector-shaped image from a sector scan which covers a selected range of azimuth angles at a selected down angle.

23 Claims, 7 Drawing Sheets

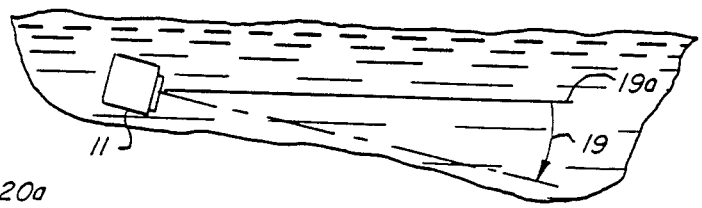
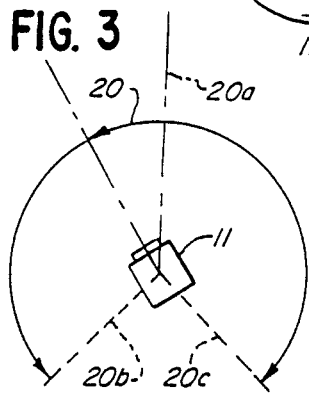
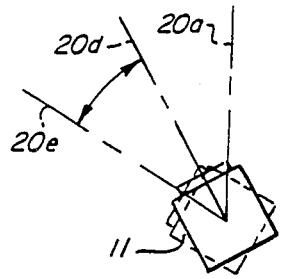
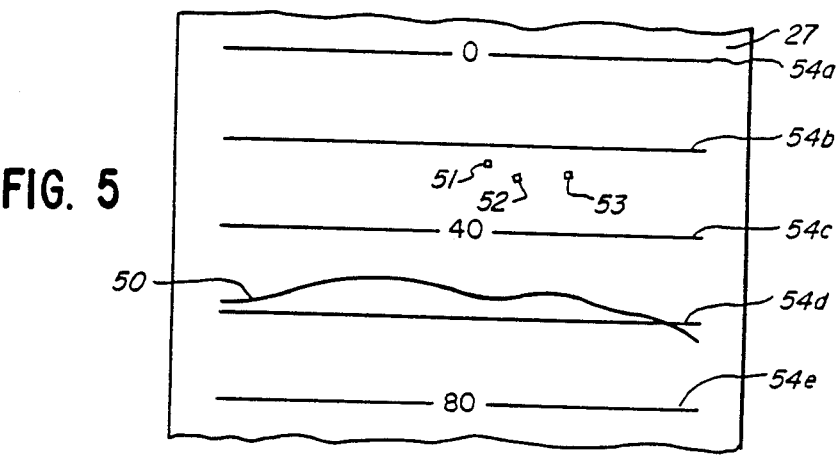
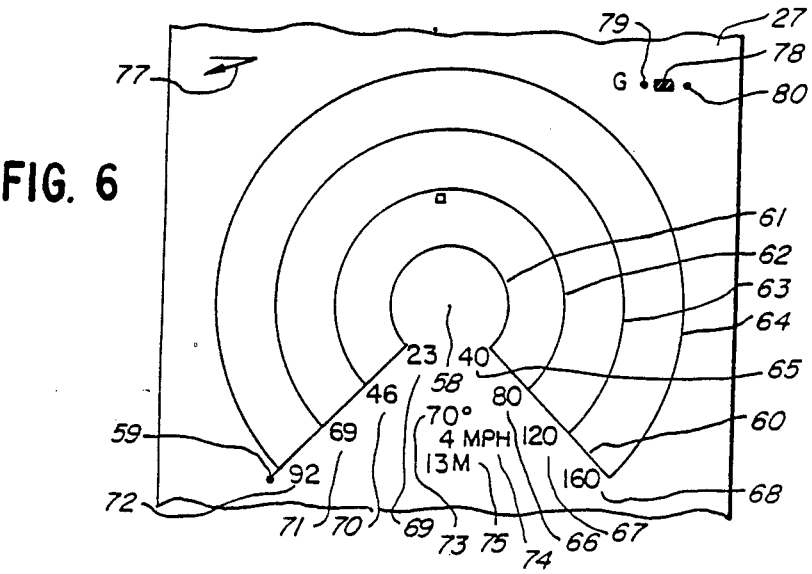

SCANNING SONAR SYSTEM

A microfiche appendix with one microfiche containing a total of 76 frames, is incorporated herein.

BACKGROUND OF THE INVENTION

1. Field of the Invention

This invention relates to a scanning sonar system and more particularly to a scanning sonar system which is usable advantageously by amateur and professional fishermen but which is also usable for navigational and other purposes. The system displays accurate, reliable, detailed and readily interpreted information as to regions which underlie and surround the path of movement of a boat. It is readily controllable for displaying information as to regions of particular interest and provides excellent performance while being relatively inexpensive and economically manufacturable.

2. Background of the Prior Art

Sonar systems have been heretofore provided in which bursts of ultrasonic energy are periodically transmitted under water with signals derived from echoes being applied to a cathode ray tube to produce indications on the screen thereof. Such systems have been used advantageously for ascertaining the depth to the bottom which underlies the body of water in which the boat is traveling and they have been used with some degree of success in locating fish. However, the accuracy of such systems has left much to be desired and there have also been problems with reliability. The systems have also been generally quite expensive.

SUMMARY OF THE INVENTION

This invention was evolved with the general object of overcoming disadvantages of prior sonar systems and of providing a system with greatly improved capabilities, particularly with respect to location of fish and the accurate location of rocks, shallow areas or other objects which present navigational hazards.

It is also an object of the invention to provide a system which is very easy to use even by unskilled operators having little prior familiarity with the operation of sonar systems.

A further object of the invention is to provide a system which has excellent performance characteristics while being highly reliable and economically manufacturable.

In accordance with an important feature of the invention, a system is provided which includes a scanning transducer, with means for moving the transducer about a vertical axis and in a sector having predetermined limits to scan a particular region. In addition to scanning movement about a vertical axis, the angle of the axis of the beam of the transducer relative to a horizontal plane may be adjusted. In addition, the scanning transducer has a quite narrow beam angle such that echoes are received only from a region of restricted dimensions, for permitting accurate location of underwater objects.

In accordance with an important feature, echo indications are displayed on the screen of a cathode ray tube along radial lines which extend outwardly from a center point of the screen, in a direction corresponding to the scan angle of the beam about the aforementioned vertical axis, and distance information is displayed on the screen, preferably by producing reference lines on the screen which extend arcuately about the center point and which are identified by indicia which corresponds to the distance of interest. The distance indicia preferably includes both a horizontal component and a vertical component, which are determined by taking into account the down or tilt angle of the scanning beam. As a result, the operator can quickly determine both the horizontal distance to a and the depth of a fish or other reflecting object, with high accuracy.

Another important feature of the invention relates to selective control of range distances in the scan mode of operation and also in a down-looking mode of operation and in the automatic control of scan or sounding rates to use as high a rate as possible and to maximize the information obtained. A specific feature is that in the scan mode, the range is selected in accordance with the maximum horizontal distance, rather than by the actual direct line distance to an object, Further important features of the invention relate to various operational and display options made available to the user of the system and to implementation of operations of the system with features including the use of two microcomputers and special memory control and refresh, A/D, transducer driver and other circuitry for obtaining optimum results and at minimum expense.

This invention contemplates other objects, features and advantages which will become more fully apparent from the following detailed description, taken in conjunction with the accompanying drawings.

BRIEF DESCRIPTION OF THE DRAWINGS

FIG. 2 is a diagrammatic side view of a scanning transducer of the system;

FIG. 3 is a diagrammatic top view of the scanning transducer of FIG. 2;

FIG. 4 is a view similar to FIG. 3, showing selected limit angles;

FIG. 5 shows the appearance of a display screen in a down mode of operation;

FIG. 6 shows the appearance of a display screen in a scan mode of operation;

DESCRIPTION OF A PREFERRED EMBODIMENT

Figure 1:
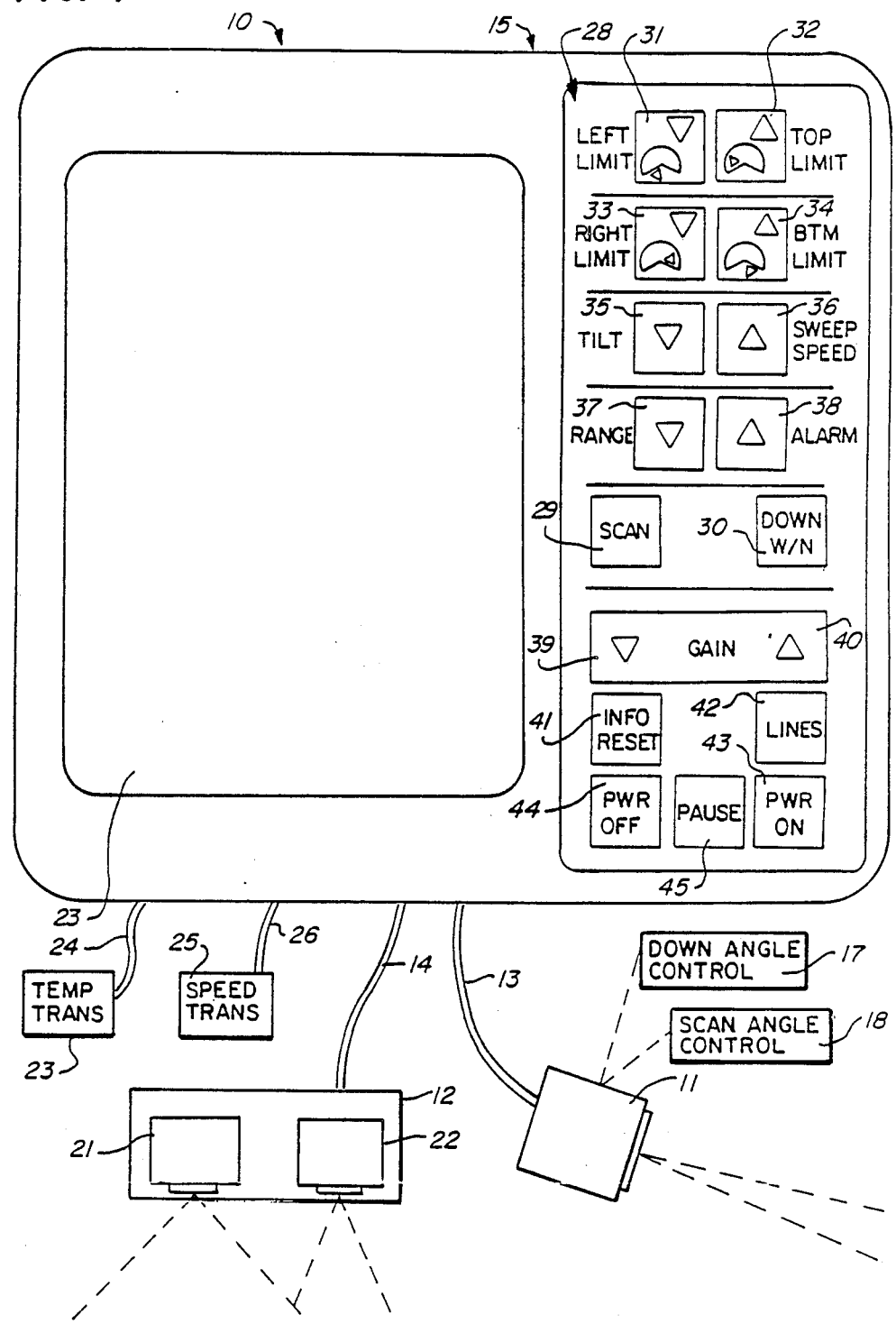
FIG. 1 is a diagrammatic showing of a scanning sonar system constructed in accordance with the invention.

Reference numeral 10 generally designates a scanning sonar system constructed in accordance with the principles of the invention. As shown diagrammatically in FIG. 1, the system 10 includes a scanning ultrasonic transducer unit 11 and a down-looking ultrasonic transducer unit 12 which are connected through cables 13 and 14 to a control and display unit 15, the scanning transducer 11 being used in a scan mode of operation and the down-looking transducer being used in a down mode of operation. The scanning transducer unit is part of an assembly 16 which includes a down angle control unit 17 and a scan angle control unit 18. The system may be mounted on a fishing boat, for example, with the transducer units 11 and 12 and the assembly 16 being mounted on the boat by suitable transom, through-hull or bow mounts to position the transducer unit under the water surface.

Each of the transducer units 11 and 12 functions to periodically transmit bursts of ultrasonic energy into the water and to receive echoes back from fish and/or the underlying bottom surface, rocks and other objects which may be in the path of the effective beam of the transducer unit. An important feature is that the scanning transducer unit 12 is operated at a high frequency, on the order of 160 Khz or higher, such that it has a quite narrow beam angle, preferably of on the order of 5 degrees or less, and the directional angle of its beam is controlled by the down angle control unit 17 and the scan angle control unit 18, both having stepping motors or the equivalent for moving the transducer unit 11 to an angular position which corresponds to digital signals applied thereto. As a result of the narrow beam, fish and other small objects do not appear "arched" but instead appear as dots or short lines and are readily identified. With wider beams used in the down mode, the same fish or other small objects will appear arched.

The down angle is indicated by reference numeral 19 in FIG. 2 which is a diagrammatic side view of the scanning transducer 11. It is measured downwardly from a horizontal plane which is indicated by reference numeral 19a and which is parallel to the water surface. In the illustrated system, it may be adjusted through a range of from 10 to 70 degrees.

The directional scan angle is indicated by reference numeral 20 in FIG. 3 which is a diagrammatic top view of the scanning transducer 11. It is measured from a vertical plane which is indicated by reference numeral 20a and which is aligned with or parallel to the direction in which the boat is moving. It may, for example, be swept through a range of from −135 to +135 degrees, between limit angles 20b and 20c as indicated or through a shorter range selected by the operator. FIG. 4 shows scanning between limit angles 20d and 20e of about −30 and −60 degrees as an example of limit angles which might be selected by the operator to concentrate examination on a region of particular interest.

The down-looking transducer unit 12 preferably comprises a wide angle transducer 21 and a narrow angle transducer 22 which may have effective beam angles of on the order of 40 degrees and 15 degrees, for example and which are selectable by the operator.

A temperature transducer 23, which may be physically associated with one of the transducers 11 or 12 and located in the water, is shown connected through a cable 24 to the control unit. Also, a speed transducer 25 is shown connected through a cable 26. Transducer 25 may include a paddle wheel or other type of impeller which is driven in response to movement through the water and which develops a pulse in response to each increment of movement.

Important features relate to the modes of operation and obtainable with the system of the invention and the ways in which such modes of operation are controllable to obtain optimum results in a variety of conditions. The control and display unit 15 includes a color cathode ray tube display screen 27 and a keyboard 28. When a "SCAN" key 29 is depressed, the scan mode of operation is obtained in which the directional angle of the scanning transducer unit 11 is swept through a selected range and in which fish or other reflecting objects are indicated on the screen 27. When a "DOWN" key 30 is depressed, the down mode of operation is obtained in which the down-looking transducer unit 12 is operative and in which the location of the underlying bottom surface and of fish or other reflecting objects, are indicated on at positions on the screen 27 which correspond to the position of the reflecting object. The "DOWN" key 30 is also usable as a toggle for selective control between the wide and narrow beam transducers 21 and 22 of the down-looking transducer unit 12.

Eight keys 31-38 are provided on the upper portion of the keyboard 28 which are grouped in four pairs and which are usable to perform functions according to whether the scan mode or the down mode has been selected, the scan mode functions being indicated by labels on the left side of the keyboard 28 and the down mode functions being indicated by labels on the right side of the keyboard 28. In the scan mode, keys 31 and 32 control the left limit angle of the scan angle, key 31 being pressed to increase the left limit angle and key 32 being pressed to decrease the left limit angle; keys 33 and 34 similarly control the right limit of the scan angle; keys 35 and 36, labelled "TILT", adjust the down angle upwardly or downwardly; and keys 37 and 38, labelled "RANGE", are usable to increase or decrease the distance range of indication of echoes. By way of example, the maximum surface range may be 320 feet.

In the down mode, keys 31 and 32, labelled "TOP LIMIT", are usable to set the depth which the operator desires to correspond to the top of the screen 27; keys 33 and 34, labelled "BTM LIMIT", are usable to set the depth which the operator desires to correspond to the bottom of the screen 27; keys 35 and 36, labelled "SWEEP SPEED", are usable to increase or decrease the rate of scrolling of the screen 27; and keys 37 and 38, labelled "ALARM", are usable to decrease or increase a depth at which an alarm signal is produced.

The bottom portion of the keyboard 28 includes keys which are operative to perform the same or similar functions in both the scan and down modes. A pair of keys 39 and 40, labelled "GAIN", are usable to adjust the sensitivity of a receiver in either mode. A key 41 is usable to toggle between normal displays and a display which is such that speed, distance and temperature are indicated. A key 42, labelled "LINES", is usable to toggle depth lines on or off in the down mode or the scan cursor on or off in the scan mode. Keys 43 and 44 are power on and power off keys, the power on key 43 being also usable to reset a distance indication when held down. A key 46 between keys 43 and 44, labelled "PAUSE", is usable to freeze the screen at its current condition, to permit extended examination thereof.

Specific features relate to the form of display produced in the down mode of operation, as depicted in FIG. 5. Each sounding produces a vertical column on the screen 27 with bright spots being produced in response to reflections or echoes from underwater objects. In the down mode, as well as in the scan mode, echo signals are sorted by amplitude and are presented as different colors on the screen. Preferably, the color changes to blue, then yellow and then red as the echo level changes from weak to strong. It is found that this feature produces optimum results from the standpoint of providing clear, reliable unambiguous and readily interpreted indications, while minimizing cost of manufacture.

Each vertical column is initially produced at the left side of the screen 27 and displaced to the right when another column is produced from the next sounding operation and there may be 256 vertical columns closely adjacent to one another and extending across the width of the screen, for example. A generally horizontal but irregular indication 50 may typically extend across a lower portion of the screen 27, indicating the contour of the bottom of the body of water in which the system is operated. Indications 51–53 are produced by fish or other objects which are above the bottom, it being noted that one object may produce indications in a number of consecutive soundings, to produce an indication extending horizontally across the screen.

To indicate depth, a plurality of horizontal depth-indicating lines are produced on the screen 27, five lines 54a–54e as shown being produced in the illustrated embodiment. Periodically, depth indicating indicia are entered into a column as it is produced at the left side of the screen 27, to move to the right across the screen. As the indicia carrying column leaves the right side of the screen, indicia is entered into the column being formed at the left side of the screen, so that depth indicating indicia appear at all times. Depth indications, in feet, of "0", "40" and "80" are in lines 54a, 54c and 54f as shown and may be produced when the system is initially powered up, but the top and bottom limits may changed as desired through operation of the keys 31–34, in increments of ten feet and with a bottom limit of 1000 feet. For example, if the top limit is changed to 60 feet and the bottom limit to 120 feet, indications of "60", "90" and "120" are produced in the lines 54a, 54c and 54f.

The relationship between a horizontal distance on the screen 27 and a corresponding underwater distance depends upon the speed of movement of the boat and also upon the sounding rate or scroll speed, which is variable. The scroll speed is changed automatically in generally inverse proportion to depth, soundings being performed less frequently as the depth is increased to await receipt of all echoes from the transmission of one burst of energy before transmission of the next burst. However, the scroll speed may be reduced by the operator, using the keys 35 and 36 to produce indications which will provide more information to a skilled operator with respect to the nature of the region being examined.

Further important features of the invention relate to the form of the display produced on the screen 27 in the scan mode of operation, as shown in FIG. 6. Radial indicating lines are produced on the screen which extend radially outwardly from a center point 58, each such radial indicating line being produced in response to a scanning operation in which a burst of ultrasonic energy is transmitted from the scanning transducer 11 in a narrow beam having an axis at certain down and scan angles. Scan-limit reference lines 59 and 60 are also produced which, as shown, may respectively extend angularly downwardly from the screen center point 58, at angles of +135 and −135 degrees measured in a CCW direction. The lines 59 and 60 correspond to the limits of the scan angle of the scanning transducer 11 and, while the transducer 11 is moved from one of such limits to the other, a series of 256 scanning operations may be performed and 256 indicating lines are produced at corresponding angular positions. After reaching one limit, the direction of movement of the transducer is reversed.

In addition, four arcuate distance reference lines 61–64 are formed which extend arcuately between the radial lines 59 and 60. The radial distance from the center point 58 to each of such arcuate reference lines corresponds to the horizontal component of the distance from the scanning transducer to a reflecting surface which is on the axis of the scan beam and which would produce an indication at that line. Such horizontal distance components are indicated adjacent the right-hand scan-limit reference line and, as shown the indicia of "40", "80", "120" and "160" and indicated by reference numerals 65–68 are produced adjacent the ends of the arcuate indicating lines 61–64.

If, for example, an indication of a fish is produced at the line 62 in the illustrated condition, it indicates that the horizontal distance component to the fish is 80 feet. If the down angle is 30 degrees, the actual distance from the scanning transducer to the fish may be about 92.4 feet (80 feet divided by the cosine of 30 degrees). Generation of such reference lines requires that the down angle be taken into account. However, it provides very important advantages not only in providing information as to the horizontal component of the distance, but also in providing information as the vertical or depth component. At any given down angle, the vertical or depth component is equal to the horizontal component multiplied by the tangent of the down angle. Such vertical components are indicated at the left, adjacent the left-hand scan-limit reference line 59. In the illustrated condition, indicia of "23", "46", "69" and "92" and indicated by reference numerals 6972 are produced adjacent the ends of the arcuately extending distance reference lines 61–64.

When the range is changed, the horizontal and depth reference indicia are changed in accordance with the range. For example, if the range is changed to a horizontal range of 320, the horizontal reference indicia 65–68 are changed to "80", "160", "240" and "320" and, when the down angle is 30 degrees, the depth reference indicia 69–72 are changed to "46", "92", "139" and "185". The reference indications are also changed when the scan limits are changed through use of the keys 31–34.

The depth indicating feature is highly desirable in looking for hidden and potentially dangerous underwater objects, in navigating narrow channels, in providing information as the depth at which fish are located and for other purposes including the location of persons who may have accidentally slipped underwater to be potential drowning victims if not immediately located.

Additional indications are produced on the screen 27 in the scan mode, including a temperature indication 73, a speed indication 74 and an odometer indication 75, produced in the lower central portion of the screen. An angle indication is produced in the upper left corner, in the form of an arrow 77 pointing downwardly and to the left at the current down angle. In the upper right corner, a gain indication is produced in the form of a bar 78 which extends horizontally from a dot 79 toward a dot 80, and having a length proportional to gain or sensitivity.

Figure 7:
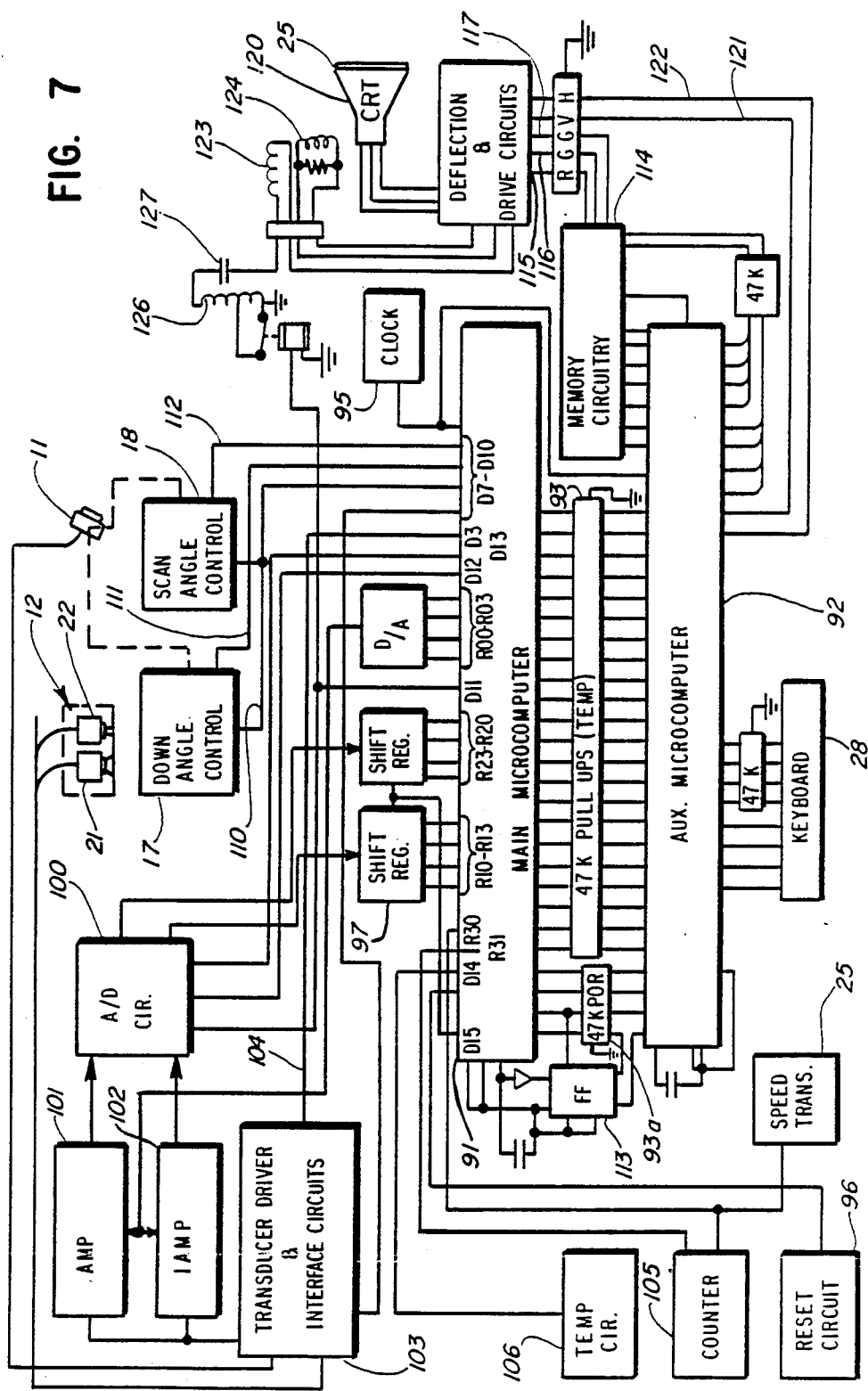
FIG. 7 is a schematic block diagram of circuitry of the system.

The control and display unit 15 comprises microcomputer circuitry 90 which is shown schematically in FIG. 7 and which comprises two microcomputers 91 and 92, each being operative to perform certain functions while other functions are performed by the other microcomputer. A feature of the circuitry is that the two microcomputers are substantially identical with the same mask-programmed ROM, but each uses only a portion of the ROM to perform its assigned function. This provides part interchangeability and greatly increases performance but with minimal increase in the cost of manufacture of the circuitry, as compared to using a single microcomputer or two separately programmed microcomputers.

The microcomputer 91 is referred to herein as the master or main microcomputer and it performs primary control functions and functions directly related to the ultrasonic operations including control and driving of the ultrasonic transducers, the registering of received echo signals, control of gain, control of down and scan angles and processing of distance and temperature data. The microcomputer 92 is referred to herein as the slave or auxiliary microcomputer and it performs other functions including strobing of the keyboard 28 and acquisition of data therefrom, refreshing of a dynamic memory which is used as a screen memory in the system, and the generation of horizontal and vertical sweep signals for operation of the cathode ray tube of the system. Bus communication is provided between the two microcomputers, certain ports being connected together and to pull-up resistors as indicated by block 93 and others being connected together and to pull-down resistors indicted by block 93a.

A clock or oscillator circuit 95 is connected to both of the microcomputers 91 and 92 and a wake-up timer or reset circuit 96 is connected to the main microcomputer 91 which has input/output ports identified by numbers with "R" and "D" prefixes as shown in the drawing, the same identifcations being used in the source code statement which is included as an appendix. A group of four ports, labelled R10–R13, are connected to a shift register 97 and another group of four ports, labelled R20–23, are connected to a shift register 98, a clock signal being applied to the shift registers 97 and 98 from a port D15. Shift registers 97 and 98 are used as buffers to temporarily store MSB and LSB signals which are developed by a A/D converter circuit 100 which has an input coupled to the outputs of amplifiers 101 and 102 which are respectively operable in the scan and down modes. The inputs of amplifiers 101 and 102 are connected to a transducer driver and interface circuit 103 which is connected to the scan transducer 11 and the wide and narrow transducers 21 and 22 of the down transducer unit 12. A trigger signal is applied to the circuit 103 through a line 104 connected to port D3.

A port R30 is connected to a counter circuit 105 to which pulses are applied from the "paddle wheel" transducer 25 and a port D14 is connected to a temperature sense circuit 106.

A port D11 is connected to a "S/D" line 107 to apply control signals to amplifier circuits 101 and 102 according to whether the down mode or the scan mode of operation has been selected.

A four bit digital signal is developed at group of four ports R00–R03 and is applied to a circuit 108 which develops a corresponding analog signal which is applied to the amplifiers 101 and 102 for control of gain. Two additional ports D12 and D13 are connected to the converter circuit 100 for control of thresholds in accordance with the current distance range of operation.

A port D7 applies a "W/N" signal on a line 109 which is connected to the interface and driver circuit 103 for control of whether the wide beam transducer 21 or the narrow beam transducer 22 is used in the down mode of operation. "D", "S0" and "S1" signals are applied through lines 110, 111 and 112 to the control units 17 and 18 from three ports D8, D9 and D10, the "S0" line 111 and the "S1" line 112 being used for applying step signals for control of the tilt or down angle and the azimuth or scan angle, respectively, and the "D" line 110 being used to control the direction of the stepping movements.

A flip-flop 113 is connect to both of the microcomputers 91 and 92 for passing control or handshake signals during transfers of data from one to the other and pull-up resistor units are connected to various ports of the two microcomputers as shown.

The slave or auxiliary microcomputer 92 has ports connected to the keyboard 25 and additional ports are connected to memory circuitry 114 which includes associated refresh circuitry and which supplies red, green and blue intensity control signals through lines 115, 116 and 117 to a deflection and driver circuit 118 for a cathode ray tube 120 which provides the display screen 25 of the control and display unit 15. Horizontal and vertical trigger signals are developed at two ports D8 and D9 which are connected through lines 121 and 122 to the deflection and driver circuit 118.

Deflection yokes 123 and 124 are associated with the cathode ray tube 120 which is oriented with its screen at 90 degrees relative to the normal position, the yoke 123 being what is normally referred to as the "horizontal yoke" but being operative to produce vertical deflection and yoke 124 being what would normally be referred to as the "vertical yoke" but being operative to produce horizontal deflection. In the down mode, there is no need to adjust the horizontal/vertical deflection ratios. However, in the scan mode, it is desirable to do so in order to produce the proper indications. Otherwise, arcuately extending distance reference lines 61–64 would appear as partial ellipses and the postions of echo indications would be similarly distorted. In the illustrated system, the proper correction is obtained in a very simple way, by providing a size control coil 126 which is connected in series with a capacitor 127 and with the yoke 123, the coil having a tap 128 which is connectable to a grounded end thereof through a relay contact 129, contact 129 being normally closed, in the scan mode, but being opened when a relay coil 130 is energized, in the down mode, through a signal applied on the D/S line 107.

Figure 8:
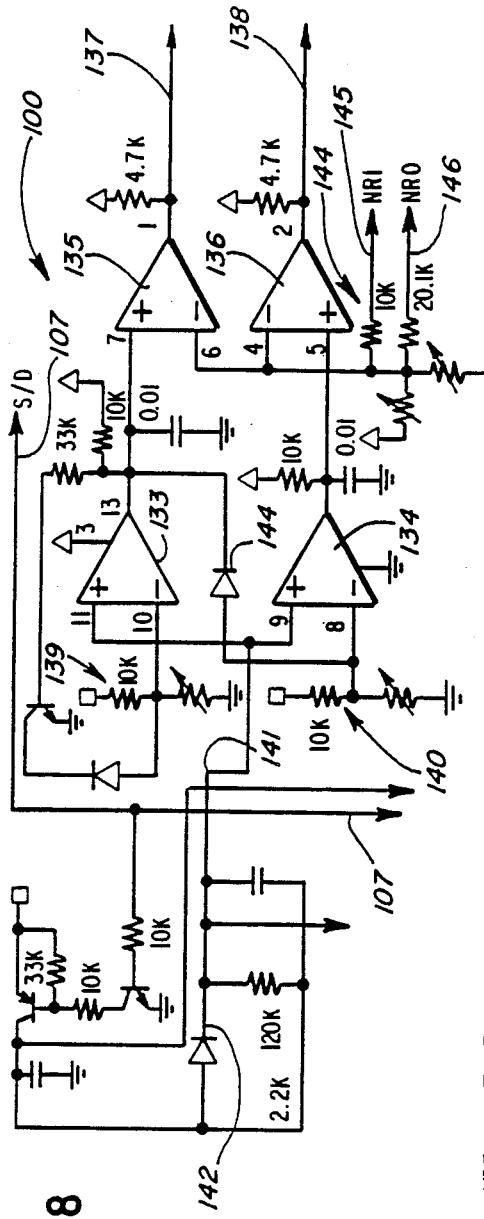
FIG. 8 shows a A/D circuit of the system.

FIG. 8 is a schematic diagram of the A/D converter circuit 100 which includes two input operational amplifiers 133 and 134 and two output operational amplifiers 135 and 136, the latter being connected to the outputs of the input amplifiers and being operative to develop MSB and LSB signals which are applied through lines 137 and 138 to the shift registers 97 and 98. Minus inputs of the input amplifiers 133 and 134 are connected to voltage divider circuits 139 and 140 for applying reference voltages which determine threshold levels, and the plus inputs thereof are connected together and to a line 141 which is connected through an isolation diode 142 to the output of amplifier 101, line 141 being also connected through a similar isolation diode to the output of amplifier 102.

In operation of the circuit, when the voltage on line 141 is above a certain level, determined by the voltage divider circuit 140, the amplifier 134 develops an output signal which is applied to the amplifier 136 to develop the LSB signal on line 138. When it increases to a second and higher level, the amplifier 133 applies an output signal to the amplifier 135 to develop a MSB output signal on line 137. At the same time, a voltage is applied from the output of amplifier 133 and through a diode 144 to the minus input of amplifier 134 to establish a threshold level which is higher than the initial level and which is also higher than the second level, such that amplifier 134 does not operate until the voltage level exceeds a third level. Thus, only the two amplifiers 133 and 134 are required to establish a four bit conversion. The minus inputs of amplifiers 135 and 136 are connected to a voltage divider network, as shown, which is connected through lines 145 and 146 to the D12 and D13 ports of the microcomputer 91.

A transistor 147 is controls application of a supply voltage to amplifier 101 and is controlled through an inverting transistor 148 from the line 107. A transistor similar to transistor 147 is directly controlled from the line 107 to control application of a supply voltage to the amplifier 102.

Figure 9:
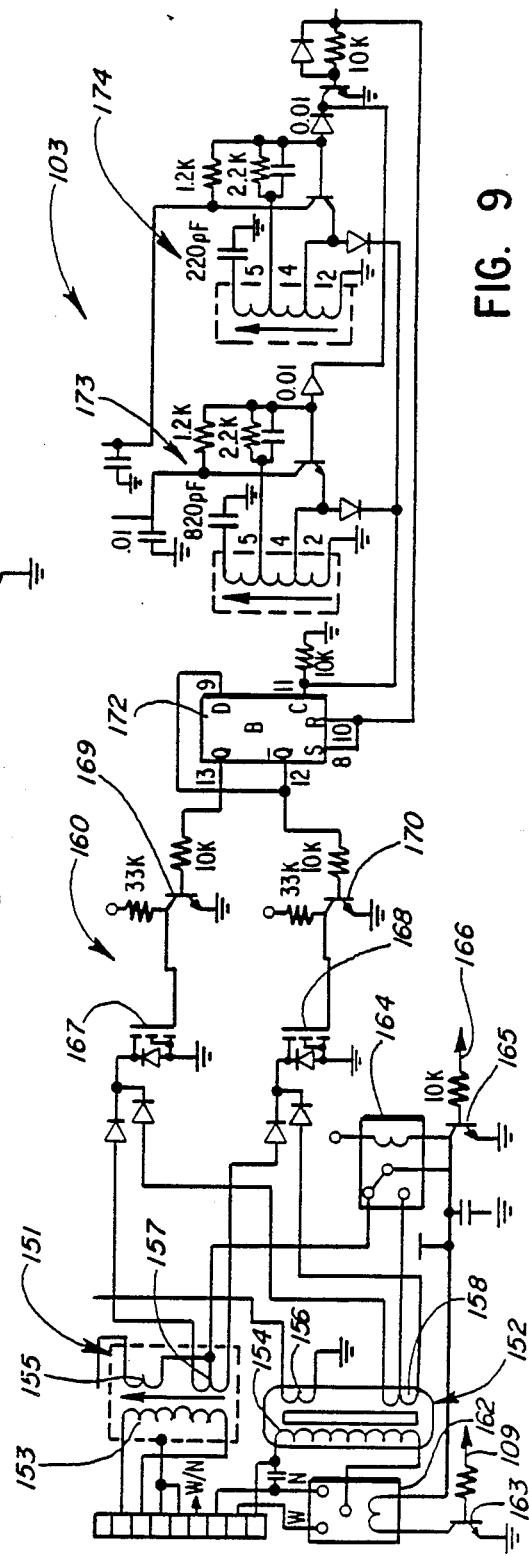
FIG. 9 shows a transducer interface and driver circuit of the system.

FIG. 9 is a schematic diagram of the transducer driver and interface circuits 103 which include two transformers 151 and 152 having windings 153 and 154 for connection to the transducers 11 and 12, windings 155 and 156 which are connected to he inputs of amplifiers 101 and 102 and center tapped windings 157 and 158 which are driven from driver circuitry 160, depending upon whether the scan mode or the down mode has been selected. The transformers 151 and 152 are of types such that there is minimum coupling from the winding 155 to the winding 157 in the transformer 151 or from the winding 156 to the winding 158 in the transformer 152. The winding 153 of transformer 151 is connected to the scanning transducer 11 while the winding 154 is selectively connectable to the transducers 21 and 22 of the down-looking transducer unit 12, a relay 162 being provided for this purpose, controlled through a transistor 163 from the wide/narrow control line 109. Another relay 164 is provided for controlling the application of an operating voltage to the center taps of windings 157 and 158, the relay 164 being controlled through a transistor 165 from a line 166 which is connected to the supply voltage line of the amplifier 102 and which, in turn, is controlled from the S/D line 107.

The driver circuit 160 comprises two MOSFET's 167 and 168 connected through isolation diodes to the windings 157 and 158, as shown. Input electrodes of the two MOSFET's 167 and 168 are connected through buffer transistors 169 and 170 to opposite outputs of a flip-flop 172 which is driven either from a low frequency oscillator 173 or a high frequency oscillator 174. Operating voltages for the oscillators 173 and 174 are supplied in parallel with the operating voltages to the amplifiers 101 and 102, being controlled from the S/D line 107.

The flip-flop 172 is preferably so operated that the on and off periods are substantially the same, for obtaining balanced drive of the center tapped windings 157 and 158 of the transformers 151 and 152. This arrangement avoids the need for separate phase-splitter transformers for the high frequency operations, and provides a very efficient and reliable drive of the transducers.

Figure 10:
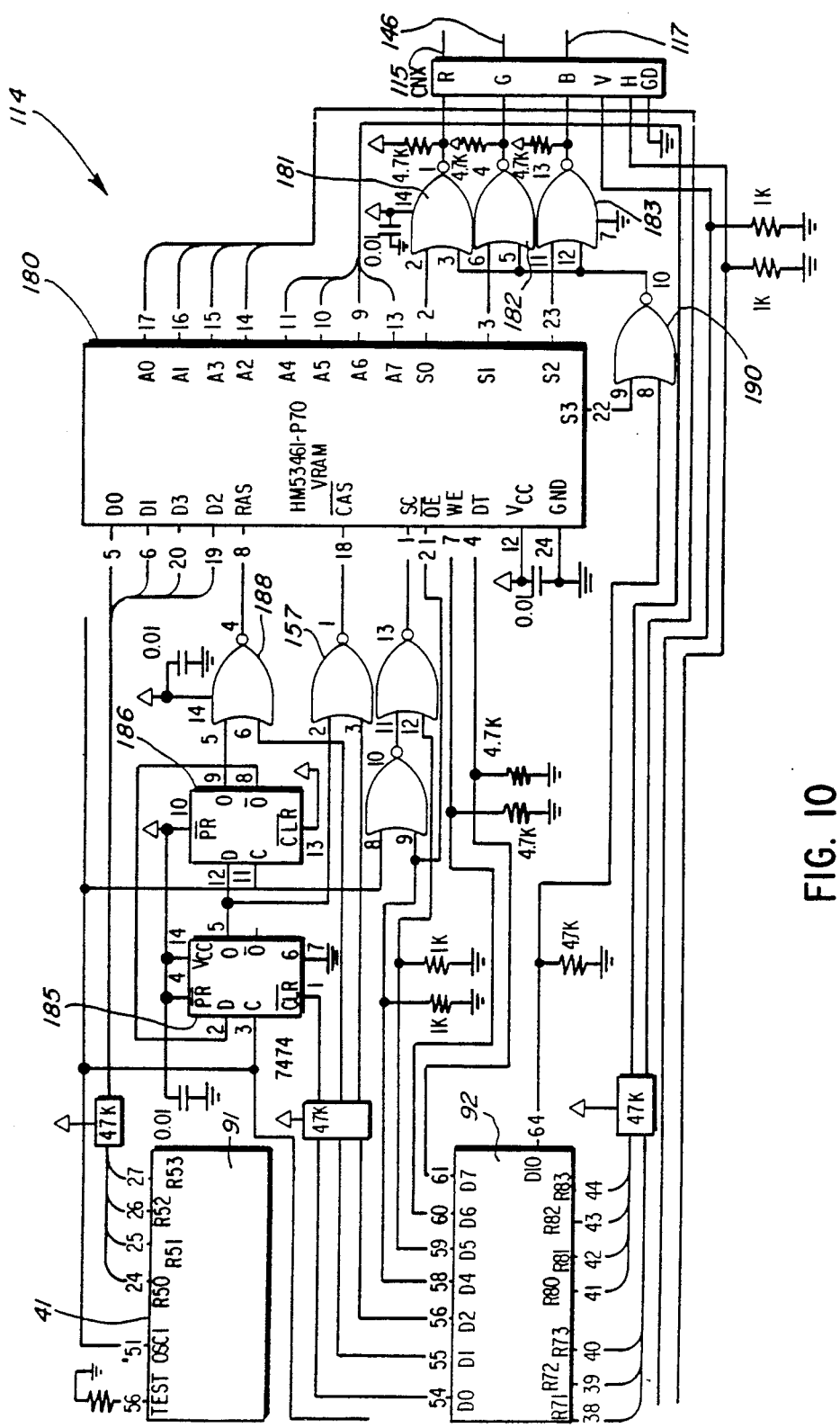
FIG. 10 shows memory circuits of the system.

FIG. 10 is a schematic diagram of the memory circuit 114 which includes a VRAM 180 which has data and address lines connected to the main and auxiliary microprocessors 91 and 92 in the manner as shown, and which has outputs connected through gates 181, 182 and 183 to the RG and B lines 115, 116 and 117. The memory 180 stores screen information in 256 columns, with four bits per pixel to include the red, green and blue color information. To refresh the memory 180, a special circuit is provided which includes two flip-flops 185 and 186 operable as a sort of ring counter, the outputs thereof being connected through gates 187 and 188 to CAS and RAS terminals of the memory, as shown. In an initial condition, the Q outputs of both flip-flops 185 and 186 are low. As clock signals are applied, the Q outputs of the flip-flops change consecutively to 1,0, then to 1,1, then to 0,1 and then back to 0,0, and in effect, square waves are applied to the CAS and RAS terminals with the CAS wave leading the RAS wave by 90 degrees, which is the condition required for proper refresh. When it is desired to alter or read from the memory, signals are applied to the gates, as illustrated, to permit the read or write operations but while the automatic refresh operation automatically continues after the read or write operations are completed.

The gates 181–183 are controllable through a gate 190 from an output of the auxiliary microcomputer 92 when it is desired to temporarily discontinue application of the signals to the cathode ray tube.

A source statement for the code which is contained in the ROM's of both of the microcomputers is set forth in a microfiche appendix submitted herewith, including 76 pages plus a title page. The various ports are defined in the source statement as well as the memory locations for constants, subroutines and the like, and a cross reference table is contained at the end of the source statement. All rights of copyright are reserved on behalf of Span, Inc., 1988.

Figure 11:
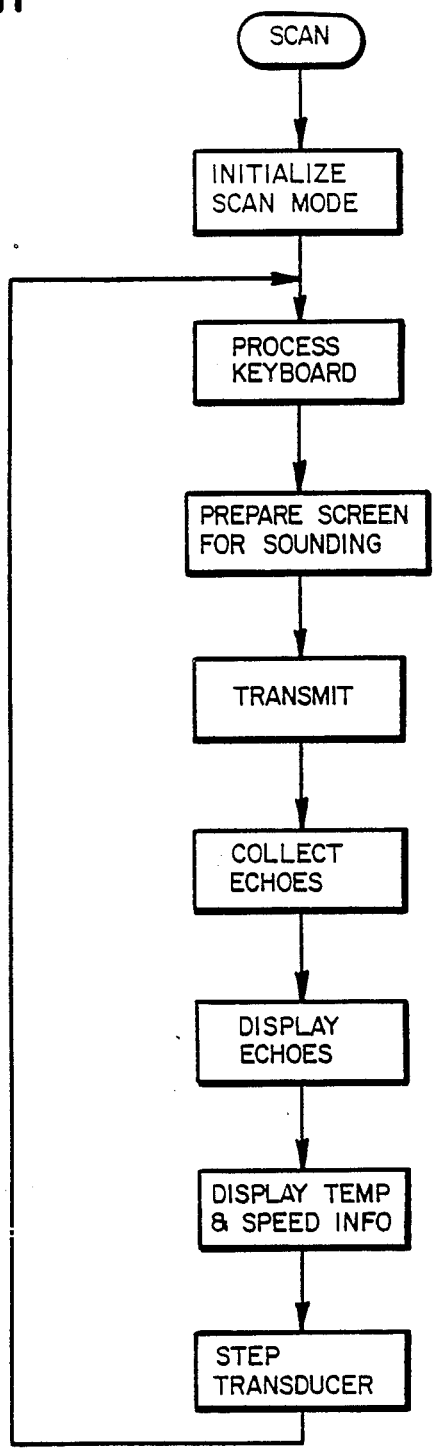
FIG. 11 is a flow chart showing scan mode operations.
Figure 12:
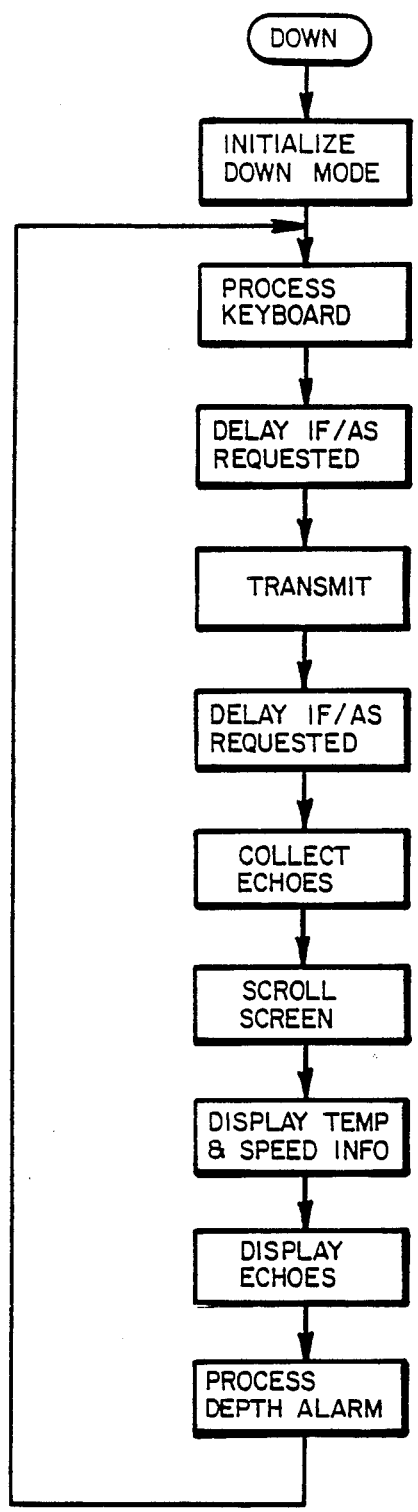
FIG. 12 is a flow chart showing down mode operations.

FIG. 11 is a flow chart illustrating the operations performed in the scan mode and FIG. 12 is a flow chart illustrating the operations performed in the down mode. In the scan mode, a process is first performed after which the keyboard is processed, to determine whether any change in operation has been selected by the user. It should be noted that the auxiliary microcomputer 92 performs its various operation including the memory refresh and scanning of the keyboard and the generation of horizontal and vertical synchronizing signals on a comparatively "tight" time schedule and when a keyboard operation is detected, the auxiliary microcomputer 92 operates through the flip-flop 113 to signal the microcomputer that such an operation has been requested. If, for example, the keyboard operation signifies the range change, the parameters for the scan rate and for generation of distance reference lines and the like may be changes, it being noted that the scan rate is always as high as possible.

After processing the keyboard, the screen is prepared for a sounding operation, this preparation includes the calculation of the delta X and delta Y increments of movement of the scanning spot in accordance with the existing scan angle and may also include the writing of a white dotted scan line when such a scan line is desired by the user on the screen.

Then a burst of ultrasonic energy is transmitted having a duration dependent upon range.

As a next step, echoes are collected and sampled according to the strength, being placed in a buffer, to be written into the memory 180 at the next available time, as determined by the operation of the auxiliary microcomputer 92. At that time, the information is read into the memory 180 for display.

The next operation is to step the transducer to a new scan angle, either clockwise or counterclockwise. At this time and if the transducer is at one of the selected or default limit positions, and if it is desired that speed and temperature indications be placed on the screen, such operations are automatically performed. The overall operation is then repeated, as indicated in FIG. 11.

The down operation is similar, but includes provisions for control of the sounding interval when an offset condition has been requested, e.g., when the user has selected the display of echoes from 80 to 100 feet rather than from zero to 100 feet. Of course, in the down mode, it is not necessary to calculate the delta X and delta Y values. As has been indicated, when reference distances have been placed on the screen, and when they reach a position at the right side of the screen, they are re-entered at the left side of the screen and a determination is made as to whether such an operation should be performed before repeating the basic operations shown in FIG. 12.

It will be understood that modifications and variations may be effected without departing from the spirit and scope of the novel concepts of this invention.

We claim:

1. A sonar system for installation on a fishing boat or other vessel, comprising: scanning transducer means arranged for mounting at a certain location on said vessel for underwater transmission of bursts of ultrasonic energy from said location and for developing echo signals in response to reflections of ultrasonic energy from fish or other underwater targets, scanning transducer control means for controlling said scanning transducer means to effect transmission and reception of energy along narrow beams each having a central axis at a down angle measured from a horizontal reference plane through said location and at an azimuth angle measured from a vertical reference plane through said location, an operator's control panel arranged for manual operation to develop command signals including signals which define a selected underwater region to be scanned, said scanning transducer control means being controlled from said command signals for controlling said down and azimuth angles of said beams for transmission and reception to said selected underwater region to effect scanning thereof, visual display means, and imaging means coupled to said scanning transducer means, to said transducer control means, to said control panel and to said display means and arranged to develop a visual image of said selected underwater region in a display area of said display means, said visual image including indications at locations within said display area corresponding to the locations of reflecting targets within said selected underwater region, said imaging means being arranged to control said display to indicate the horizontal distance from said location to reflecting targets indicated on said display.

2. A sonar system as defined in claim 1, said imaging means being arranged to control said display to indicate the vertical distance from said location to reflecting targets indicated on said display.

3. A sonar system as defined in claim 1, wherein said imaging means are arranged to develop target indications on said display means of different forms dependent upon the intensity of reflections from targets.

4. A sonar system as defined in claim 3, wherein said different forms of target indications are different colors.

5. A sonar system as defined in claim 1, wherein said command signals are in the form of digital signals, conversion means for effecting conversions of analog data from said scanning transducer means and said scanning transducer means into digital data, and data processing means associated with said imaging means for processing said digital signals and data for control of said display means.

6. A sonar system as defined in claim 5, wherein said command signals include a range selection signal, said data processing means being responsive to said range selection signal for control of said display means to adjust the configuration of said display area in accordance with said range selection signal.

7. A sonar system as defined in claim 5, wherein said digital data includes down and azimuth angle data, said data processing means being operative to process said down and azimuth data and to control said display means to develop distance indications which include indications of the range to targets indicated by indications in said display area of said display means.

8. A sonar system as defined in claim 6, wherein said data processing means control scanning transducer control means to effect transmission of said bursts at a periodic rate which is determined by said range selection signal and which is the highest practical rate for the selected range.

9. A sonar system as defined in claim 7, wherein said distance indications also include indications of the depth of targets indicated by indications in said display area of said display means.

10. A sonar system as defined in claim 1, wherein said visual display means comprises means for developing display pixels in an orthogonal row and column format, and wherein said imaging means comprises means for controlling the intensity of display pixels which are determined from the time of reception of a reflection from the target from said down and azimuth angles.

11. A sonar system as defined in claim 10, wherein said imaging means includes means for converting the times of receptions of reflections and said down and azimuth angles into digital data, and data processing means for processing said digital data for determining and controlling the intensity of said display pixels.

12. A sonar system for installation on a fishing boat or other vessel, comprising: scanning transducer means arranged for mounting at a certain location on said vessel for underwater transmission of bursts of ultrasonic energy from said location and for developing echo signals in response to reflections of ultrasonic energy from fish or other underwater targets, scanning transducer control means for controlling said scanning transducer means to effect transmission and reception of energy along narrow beams each having a central axis at a down angle measured from a horizontal reference plane through said location and at an azimuth angle measured from a vertical reference plane through said location, an operator's control panel arranged for manual operation to develop command signals including signals which define a selected underwater region to be scanned, said scanning transducer control means being controlled from said command signals for controlling said down and azimuth angles of said beams for transmission and reception to said selected underwater region to effect scanning thereof, visual display means, and imaging means coupled to said scanning transducer means, to said transducer control means, to said control panel and to said display means and arranged to develop a visual image of said selected underwater region in a display area of said display means, said visual image including indications at locations within said display area corresponding to the locations of reflecting targets within said selected underwater region, wherein said scanning transducer control means are arranged for controlling said transducer means to effect transmission and reception of bursts along narrow beams which have central axes extending radially from said location in angularly spaced relation to one another to cover a generally sector-shaped underwater region having an apex at said location, and said imaging means being arranged to develop in said display area a sector-shaped visual image which corresponds to said sector-shaped underwater region having an apex at said location, wherein said angularly spaced central axes of said beams are at angularly spaced azimuth angles and are all positioned substantially at a common down angle selected by the operator, and said imaging means being arranged to control said display to produce a plurality of radially spaced indications extending arcuately in concentric relation about an apex of said sector-shaped image, range indications adjacent said radially spaced indicia to indicate the horizontal distance from said location to reflecting targets indicated on said display and depth indicia adjacent said radially spaced indicia to indicate the vertical distance from said location to reflecting targets indicated on said display.

13. A sonar system as defined in claim 12, wherein said manually entered opertor commands include a commands which set the end angles of said sector-shaped underwater region and the end angles of the corresponding sector-shaped visual image.

14. A sonar system as defined in claim 12, wherein said manually entered operator commands includes a command which sets said common down angle at a selected value, said imaging means being arranged to control said display to indicate the selected value of said common down angle.

15. A sonar system as defined in claim 12, wherein the angular spread of said beams is on the order of 5 degrees or less as measured at 3 decibel points, and wherein the angular spacing between adjacent axes of transmission and reception is substantially leas than said angular spread of said beams.

16. A sonar system as defined in claim 12, wherein said scanning transducer means include a small narrow beam transducer, and mounting means supporting said transducer for pivotal movement about a first axis to a first selected angle and about a second axis transverse to said first axis, and wherein said transducer control means include means for incrementally shifting the angular position of said transducer about said second axis through a certain shift angle to effect sequential transmission along a plurality of said beam axes and to define said angular spacing between adjacent beams axes of transmission and reception.

17. A sonar system as defined in claim 13, wherein said end angles of said sector-shaped underwater region are controllable for scanning of a sector-shaped underwater region having a maximum arcuate extent of on the order of 180 degrees or more and for scanning of sector-shaped underwater regions having selected arcuate extents of less than said maximum arcuate extent.

18. A sonar system for installation on a fishing boat or other vessel, comprising: transducer means arranged for mounting at a certain location on said vessel for underwater transmission of bursts of ultrasonic energy from said location and for developing echo signals in response to reflections of ultrasonic energy from fish or other underwater targets, transducer control means for controlling said transducer means to effect transmission and reception of energy along narrow, beams from said location, visual display means, an operator s control panel arranged for manual operation to develop command signals for control of said transducer control means and said visual display means, and imaging means coupled to said transducer means, to said transducer control means, to said control panel, and to said display means and arranged to develop a visual image of a selected underwater region in a display area of said display means and also visual indications of ambient conditions which affect the operation of said system.

19. A sonar system as defined in claim 18, wherein said ambient conditions include at least one of three conditions which include temperature, the speed of movement of said vessel and the distance traveled by said vessel.

20. A sonar system for installation on a fishing boat or other vessel, comprising: scanning transducer means arranged for mounting at a certain location on said vessel for underwater transmission of bursts of ultrasonic energy from said location and for developing echo signals in response to reflections of ultrasonic energy from fish or other underwater targets, scanning transducer control means for controlling said scanning transducer means to effect transmission and reception of energy along narrow beams each having a central axis at a down angle measured from a horizontal reference plane through said location and at an azimuth angle measured from a vertical reference plane through said location, an operator's control panel arranged for manual operation to develop command signals including signals which define a selected underwater region to be scanned, said scanning transducer control means being controlled from said command signals for controlling said down and azimuth angles of said beams for transmission and reception to said selected underwater region to effect scanning thereof, visual display means, and imaging means coupled to said scanning transducer means, to said transducer control means, to said control panel and to said display means and arranged to develop a visual image of said selected underwater region in a display area of said display means, said visual image including indications at locations within said display area corresponding to the locations of reflecting targets within said selected underwater region, wherein said imaging means are controllable from said command signals to provide a scanning mode of operation in which said scanning transducer means and said display means are controlled to scan said selected underwater region and to develop said visual image of said selected underwater region, and wherein said imaging means are also controllable from said command signals to provide a down-looking mode of operation, said system further including a down-looking transducer unit for transmission and reception along a vertical axis therethrough, down-looking transducer control means for controlling transmission and reception of bursts by said down-looking transducer unit, and movement sensing means responsive to movement of said vessel and coupled to said imaging means, said down-looking transducer unit being controlled from said imaging means in said down-looking mode of operation to transmit and receive along a vertical axis through said location, and said display means being controlled in said down-looking mode of operation to produce in a display area target indications which are spaced in a first direction corresponding to said vertical axis and in a second direction corresponding to movement of said vessel.

21. A sonar system as defined in claim 20, wherein said down-looking transducer unit includes a narrow beam transducer and a wider beam transducer, said down-looking transducer control means being controllable from said command signals to effect selective use of said narrow and wider beam transducers under operator control.

22. A sonar system for installation on a fishing boat or other vessel, comprising: transducer means arranged for mounting at a certain location on said vessel for underwater transmission of bursts of ultrasonic energy from said location and for developing echo signals in response to reflections of ultrasonic energy from fish or other underwater targets, transducer control means for controlling said transducer means to effect transmission and reception of energy along narrow beams from said location, visual display means, an operator's control panel arranged for manual operation to develop command signals for control of said transducer control means and said visual display means, and imaging means coupled to said transducer means, to said transducer control means and to said display means and arranged to develop a visual image of a selected underwater region in a display area of said display means, said visual image including indications at locations within said display area corresponding to the locations of reflecting targets within said selected underwater region, a refreshable memory associated with said visual display means, a first microcomputer associated with said imaging means and arranged for control of said transducer control means and registering of received signal's, and a second microcomputer associated with said operator s control panel and arranged for control of said memory, said first and second microcomputers being interconnected for interchange of signals.

23. A sonar system as defined in claim 22, wherein said first and second microcomputers are substantially identical with the same mask-programmed ROM, each using only a portion of its ROM to perform its assigned function.

\* \* \* \* \*